June 30, 1925.
E. E. EINFELDT
WHEEL STRUCTURE
Filed Oct. 25, 1923
1,544,297
2 Sheets-Sheet 2
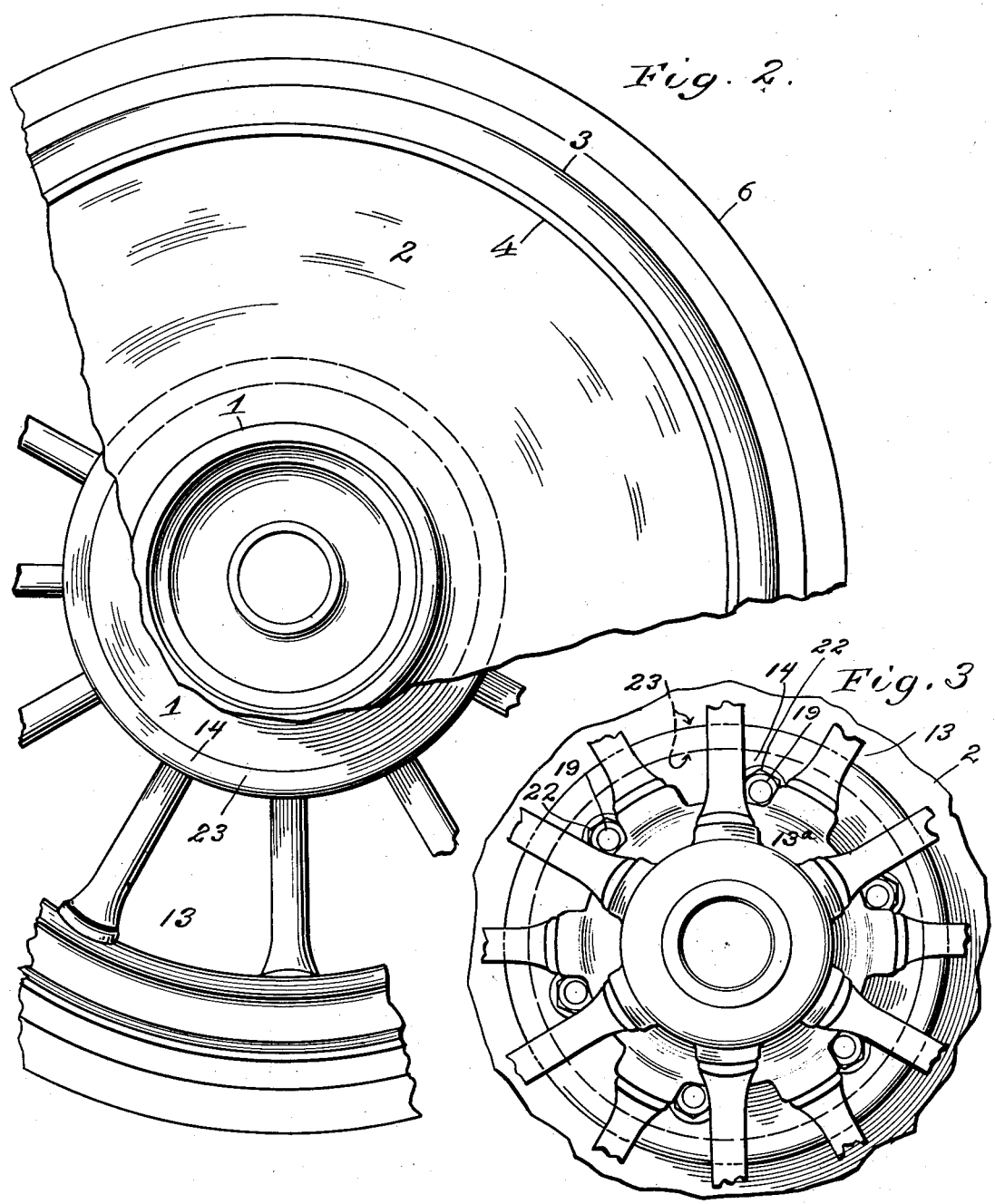
INVENTOR.
E. E. Einfeldt
BY Rogers, Kennedy Campbell
ATTORNEYS Patented June 30, 1925.

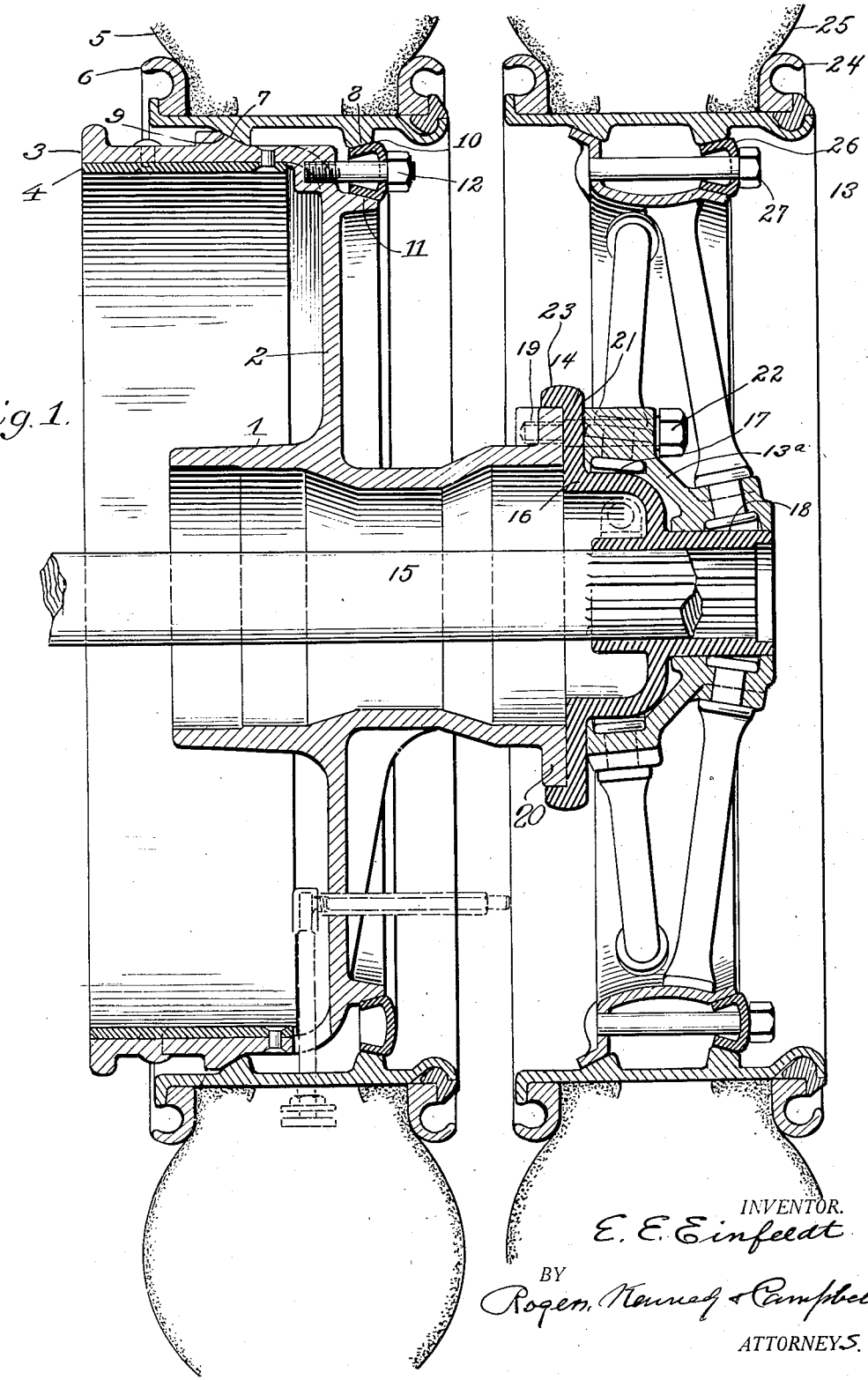

1,544,297

UNITED STATES PATENT OFFICE.

ERNEST E. EINFELDT, OF DAVENPORT, IOWA, ASSIGNOR TO G. WATSON FRENCH, JOSEPH L. HECHT, AND W. H. STACKHOUSE, ALL OF DAVENPORT, IOWA, COMPOSING THE FIRM OF FRENCH & HECHT.

WHEEL STRUCTURE.

Application filed October 25, 1923. Serial No. 670,681.

*To all whom it may concern:*

Be it known that I, ERNEST E. EINFELDT, a citizen of the United States, residing at Davenport, in the county of Scott and State of Iowa, have invented certain new and useful Improvements in Wheel Structures, of which the following is a specification, reference being had therein to the accompanying drawing.

This invention relates to wheels designed more particularly for motor vehicles, the object of the invention being to provide in a single wheel structure or organization, two drive wheels to constitute a duplex or dual wheel each with its separate and distinct tire; and the invention consists of the novel construction and arrangement of parts which will be fully described in the specification to follow, and the novel features of which will be set forth in the appended claims.

In the accompanying drawings:

Fig. 1 is a central longitudinal section through a wheel structure having my invention embodied therein.

Fig. 2 is an elevation as viewed from the inner end of the wheel structure, the same being partly broken away.

Fig. 3 is an elevation as viewed from the outer end of the structure, partly broken away.

Referring to the drawings:

1 designates a hub member or shell to which is connected, in the present instance by means of a disk or web 2, a brake drum or flange 3 which is provided with an internal braking surface 4 with which is adapted to cooperate a suitable brake mechanism not shown.

5 designates a wheel tire carried by a tire rim 6 which is mounted directly on the outer side of the brake drum. The tire rim is in the present instance of the demountable type and provided on its interior with the usual inner and inclined surfaces 7 and 8 adapted to cooperate respectively with an annular bevelled surface 9 on the exterior of the brake drum, and with a wedge ring 10 adapted to seat between the surface 9 and an annular bevelled surface 11 on the brake drum structure at its inner end. Suitable fastening bolts 12 are passed through the ring 10 and engage with the drum structure and are provided on their outer ends with nuts engaging the ring to seat the same tightly between the tire rim and brake drum and thereby confine the rim demountably on the drum.

The wheel tire 5 in connection with its tire rim, the brake drum and hub member, constitutes in effect a drive or ground wheel sustained by the hub member adjacent its inner end.

A second ground wheel 13 is sustained by the hub member or shell at its outer end and is connected thereto through the medium of a drive plate 14 which is connected in driving relation to the outer end of the hub member and is adapted as usual to be engaged with a drive axle or device 15 extending within the hub member, so that the rotary motion of the drive axle will be transmitted to the drive plate, and in turn to the hub member.

To adapt the drive plate to receive the drive wheel 13, the plate is formed with an axial extension or boss 16 having a cylindrical surface 17, and a second cylindrical surface 18 of relatively reduced diameter, the hub 13$^a$ of the wheel having its bore of different relative diameters at its inner and outer ends so as to seat over the two surfaces 16 and 17 as clearly shown in Fig. 1.

The engagement of the driving plate with the end of the hub member to cause the latter to be driven by the drive plate, is effected as usual by the provision of axial studs 19 which are passed through radial abutting flanges 20 and 21 on the adjacent ends of the hub and drive plate respectively, the said studs being provided on their outer ends with nuts 22 by means of which the two flanges may be drawn firmly together face to face. Due to the mounting of the drive wheel 13 on the drive plate as described, a vertical load is imposed on the drive plate, and in order to relieve the drive studs of this added load, the flange 21 on the drive plate is provided on its peripheral edge with an annular axially extending lip 23 which seats around the outer edge of the flange 20 on the hub. The drive plate thus has lateral engagement with the hub member independently of the drive studs, and thereby relieves the studs of the shearing stresses imposed by the wheel.

The drive wheel 13 is in the present instance provided with a demountable tire rim 24 carrying a tire 25 similar to the other wheel, and fastened demountably to the permanent rim of the wheel by the usual wedge ring 26 and the clamping bolts 27 extending through the ring and through the inner side of the permanent rim.

The wheel structure above described, is in the form of a single unitary organization made up by the hub member or shell 1; the inner drive wheel constituted by the brake drum secured to the hub member and the tire mounted on the exterior of the drum; and the outer drive wheel 13 which is sustained by the outer end of the hub through the medium of the drive plate.

While I have shown and described the two wheels as being provided with demountable tires, it will be manifest that the invention is not limited to this construction and that the tires may be permanently mounted. Also it will be understood that while I have shown my invention embodied in the particular detailed form and construction which I prefer to adopt, these details may be variously changed and modified without departing from the spirit of the invention; and further it will be understood that the invention is not limited to any particular form or construction of the parts except in so far as such limitations are specified in the claims.

Having thus described my invention, what I claim is:

1. In a wheel structure, the combination with a hub member, of a drive plate having lateral engagement with the hub member, axially extending driving members engaging the hub member and drive plate, said drive plate being adapted to be engaged by a driving device, and a drive wheel mounted on the drive plate.

2. In a wheel structure, the combination of a hub member, a drive plate provided with an annular axially extending lip seated around the end of the hub member, axially extending driving members engaging the hub member and driving plate respectively, said driving plate being adapted to be engaged by a driving axle, and a drive wheel mounted on the drive plate.

3. In a wheel structure, the combination of a hub member, a drive plate in driving engagement with the hub member and provided with an axial extension adapted to be engaged with a driving axle, and a drive wheel provided with a hub mounted on said axial extension.

4. In a wheel structure, the combination of a hub member, a drive plate in driving engagement therewith and formed with axial extensions of relatively different diameters, and a drive wheel provided with a hub formed with bores of relatively different diameters to seat on said extensions.

5. In a duplex wheel structure, the combination with a hub member of an inner drive wheel sustained thereby, a drive plate in driving engagement with the hub member and adapted to be engaged by a driving device, and an outer drive wheel mounted on the drive plate.

6. In a duplex wheel structure, the combination with a hub member and an inner drive wheel sustained thereby, of a drive plate in driving engagement with said hub member and adapted to be engaged by a driving device, and an outer drive wheel on said driving plate.

In testimony whereof, I have affixed my signature hereto.

ERNEST E. EINFELDT.